United States Patent
Wang et al.

(10) Patent No.: US 9,876,777 B2
(45) Date of Patent: Jan. 23, 2018

(54) METHOD AND BROWSER FOR ONLINE BANKING LOGIN

(71) Applicant: Beijing Qihoo Technology Company Limited, Beijing (CN)

(72) Inventors: Yinhua Wang, Beijing (CN); Huan Ren, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 0 days.

(21) Appl. No.: 14/648,196

(22) PCT Filed: Sep. 26, 2013

(86) PCT No.: PCT/CN2013/084274
§ 371 (c)(1),
(2) Date: May 28, 2015

(87) PCT Pub. No.: WO2014/082491
PCT Pub. Date: Jun. 5, 2014

(65) Prior Publication Data
US 2015/0326564 A1    Nov. 12, 2015

(30) Foreign Application Priority Data
Nov. 30, 2012 (CN) .......................... 2012 1 0506610

(51) Int. Cl.
*H04L 29/00* (2006.01)
*H04L 29/06* (2006.01)
(Continued)

(52) U.S. Cl.
CPC ......... *H04L 63/0823* (2013.01); *G06Q 40/02* (2013.01); *H04L 67/02* (2013.01); *H04L 63/168* (2013.01)

(58) Field of Classification Search
CPC ....... H04L 63/0823; H04L 67/02; H04L 9/08; G06Q 40/02; G06F 21/45
See application file for complete search history.

(56) References Cited

U.S. PATENT DOCUMENTS

2008/0028444 A1*  1/2008  Loesch ............. G06F 17/30902
                                                         726/4
2010/0325715 A1* 12/2010  Deurbrouck ............ H04L 63/08
                                                         726/9

FOREIGN PATENT DOCUMENTS

CN          101587495          11/2009
CN          101587495 A     *  11/2009
(Continued)

*Primary Examiner* — Brandon Hoffman
*Assistant Examiner* — Helai Salehi
(74) *Attorney, Agent, or Firm* — Harness, Dickey & Pierce, P.L.C.

(57) ABSTRACT

The present disclosure discloses method and browser for online banking login, solving the problems of complex and trivial steps and insecurity of online banking login via web navigation websites. The method comprises: pre-storing and managing online banking website addresses on a browser side and managing the certificates and/or online banking plugins corresponding to the online banking in the form of NPAPI; judging whether the current website address accessed by a user in the browser is an online banking website address, based on the stored online banking website addresses; when it is one of the stored online banking website addresses, using the NPAPI to call the corresponding online banking certificate and/or online banking plugin to perform online banking login. The embodiments of the present disclosure decrease steps and enhance security to log in to online banking.

17 Claims, 4 Drawing Sheets

(51) Int. Cl.
*G06Q 40/02* (2012.01)
*H04L 29/08* (2006.01)

(56) References Cited

FOREIGN PATENT DOCUMENTS

| | | | |
|---|---|---|---|
| CN | 102110198 | | 6/2011 |
| CN | 102647398 | | 8/2012 |
| CN | 102647422 | | 8/2012 |
| CN | 102664874 | | 9/2012 |
| CN | 102664874 A | * | 9/2012 |
| CN | 102724192 | | 10/2012 |
| CN | 103001960 | | 3/2013 |
| CN | 103023894 | | 4/2013 |
| WO | 2012071498 | | 5/2012 |

* cited by examiner

METHOD AND BROWSER FOR ONLINE BANKING LOGIN

FIELD OF THE INVENTION

The disclosure relates to the field of Internet technology, in particular, to method and browser for online banking login.

BACKGROUND OF THE INVENTION

At present, online banking is encountered with a severe network security situation. According to the statistics from relevant institutions, only in 2010, the number of Trojan horse viruses newly increased is about 180,000,000 throughout the country, and the number of phishing websites related to online banking increased about 1,500 per day. The security events of online banking are generally divided into three classes, one is Trojan horse attack. Lawbreakers place Trojan viruses on websites or chat tools to steal online banking accounts, password information, etc. Second is hacker attack. Lawbreakers plant Trojan viruses in computers or website addresses to remotely control computers and steal personal account information, etc. Third is network phishing. Lawbreakers trick users, with the information like system upgrade and low-price goods, etc., into a "fake online banking" page (known as phishing website), which is extremely similar to a real online banking page, to get the user's online banking information. These are the most common security events of online banking, at present.

Avoiding logging in to phishing websites mainly depends on users' good habits of using online banking. In addition, to prevent users from accessing phishing websites, quick entries to online banking are provided in some web navigation websites. But it needs users to firstly open relevant web navigation websites on their initiatives and then select the target online banking website, which leads to additional operation steps.

Moreover, when logging in to online banking, it is required to install plugin or certificate corresponding to the online banking. While the plugin or certificate cannot be installed automatically by web navigation websites, so security vulnerabilities still remain.

SUMMARY OF THE INVENTION

In view of the above problem, the present disclosure is proposed in order to provide a browser for online banking login, and a corresponding method and program for online banking login, which can overcome the above problem or at least partially solve or alleviate the above problem.

According to one aspect of the present disclosure, a method for online banking login is provided, comprising: pre-storing and managing online banking website addresses on a browser side and managing the certificates and/or online banking plugins corresponding to the online banking in the form of NPAPI; judging whether the current website address accessed by a user in the browser is an online banking website address, based on the stored online banking website addresses; when it is one of the stored online banking website addresses, using the NPAPI to call the corresponding online banking certificate and/or online banking plugin to perform online banking login.

Accordingly, the present disclosure also provides a browser for online banking login, comprising: a management module, configured to pre-store and manage online banking website addresses on a browser side and manage the certificates and/or online banking plugins corresponding to the online banking in the form of NPAPI; a website address judgment module, configured to judge whether the current website address accessed by a use in the browser is an online banking website address, based on the stored online banking website addresses; and a login module, configured to use, when it is one of the stored online banking website addresses, the NPAPI to call the corresponding online banking certificate and/or online banking plugin to perform online banking login.

According to another aspect of the present disclosure, a computer program is provided, comprising computer readable codes, causing a user terminal to execute the method for online banking login according to any one of the aforesaid methods when the computer readable codes run on the user terminal According to another aspect of the present disclosure, a computer readable medium is provided, wherein the medium stores said computer program.

The present disclosure has the benefit effect that: according to a method and a browser for online banking login of the embodiments in the present disclosure, the management of online banking certificates and/or online banking plugins is implemented in the form of NPAPI, including automatic download, installation and/or upgrade of online banking certificates and plugins. Moreover, it can be judged automatically whether the current website address accessed by a user is an online banking website address, and if an online banking website address, the online banking login is performed based on the online banking certificate and/or the online banking plugin. Thus, the problems is solved, of complex and trivial steps and insecurity of online banking login via web navigation websites, and the benefit effect is achieved, of decreasing steps of online banking login and enhancing security to online banking login. Further, in the embodiments of the present disclosure, the management of online banking certificates and/or online banking plugins is implemented in the form of NPAPI, so it can ensure the safety of using online banking in NPAPI (Netscape Plugin Application Programming Interface)-supported browsers, such as Mozilla Firefox, Google Chrome, Apple Safari, Opera, etc., which are often used in the industry.

The above explanation is merely an outline of the technical solution of the present application. In order to be able to understand the technical means of the present application more clearly and to be able to implement it in accordance with the contents of the specification, and in order to enable the above and other objects, features and advantages of the present application more evident and comprehensible, the specific embodiments of the present application are particularly described in the following.

BRIEF DESCRIPTION OF DRAWINGS

By reading the following detailed description of the preferred embodiments, various other advantage and benefits will be clear for those ordinary skilled in the art. The drawings are merely used for purpose of illustration of the preferred embodiments and are not considered as limiting of the present application. Further, the same components will be denoted by the same reference symbol throughout the drawings. In the drawings.

DETAILED DESCRIPTION OF THE INVENTION

Figure 1:
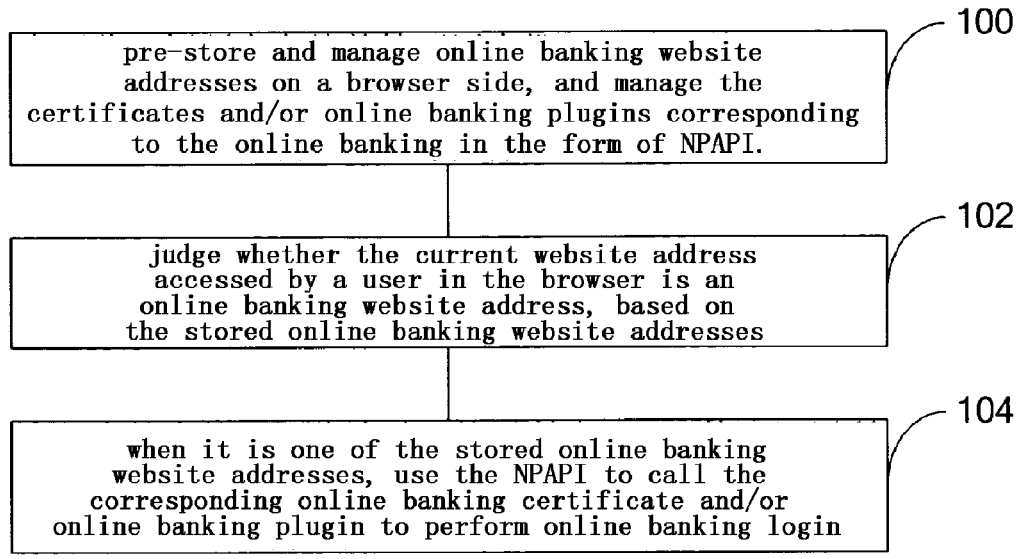
FIG. 1 shows a flow chart of a method for online banking login according to an embodiment of the present disclosure.

Combining with the drawings and specific embodiments, the present disclosure will be described further below.

Hereinbelow, refer to exemplary embodiments that describe more details of the present disclosure. Although the exemplary embodiments of the present disclosure are illustrated in the drawings, it should be understood that the present disclosure can be implemented in various forms instead of being restricted by the stated embodiments. Conversely, providing the embodiments of the present disclosure is for better understanding of the present disclosure, and more complete scope to the skilled in the art.

The embodiments of the present disclosure can be applied to computer systems/servers, and can operate jointly with a plurality of other general or specialized computer system environments or configurations. The well-known computing systems, environments and/or configurations suitable to operate jointly with computer systems/servers include, but not limited to: personal computer systems, server computer systems, thin clients, thick clients, portable or lap-top devices, systems based on microprocessor, set top boxes, programmable consumer electronics, network personal computers, small computer systems, large computer systems, the distributed cloud computing environments comprising above any system, etc.

Computer systems/servers can be described in the general context of the computer systems executable instructions (e.g., program module) which are executed by computer systems. In general, program modules can include routines, programs, object programs, components, logics, data structures and the like, that they execute specialized tasks or implement specialized abstract data types. In distributed cloud computing environment, computer systems/servers are available, and tasks are executed by remote processing devices linked through communication network. In distributed cloud computing environment, program modules can locate in storage media of local or remote computing systems including storage devices.

NPAPI, abbreviation of Netscape Plugin Application Programming Interface, is a general browser interface standard. Plugins can be used in most browsers, provided that the plugins conform to the NPAPI interface development. ActiveX, an open integrated platform, provides a quick and convenient method to create website programs and integrate content for web developers, users and web page producers.

To introduce the method and browser for online banking login disclosed by the present disclosure in detail, several specific embodiments are exemplified below.

Embodiment 1

The method for online banking login of the embodiment of the present disclosure will be fully described.

With reference to FIG. 1, it shows a flow chart of a method for online banking login according to an embodiment of the present disclosure.

In step 100, pre-store and manage online banking website addresses on a browser side, and manage the certificates and/or online banking plugins corresponding to the online banking in the form of NPAPI.

The website addresses of various online banking can be acquired and stored, and the management of the stored online banking website addresses is performed. And, the management of the certificates corresponding to the various online banking and the online banking plugins corresponding to the various online banking can be performed in the form of NPAPI; or the management of the certificates corresponding to the various online banking or the online banking plugins corresponding to the various online banking can be performed in the form of NPAPI.

In step 102, judge whether the current website address accessed by a user in the browser is an online banking website address, based on the stored online banking website addresses When the user is accessing a certain website address in the browser, it can be judged whether the current website address accessed by the user in the browser is an online banking website address based on the stored online banking website addresses.

In step 104, when it is one of the stored online banking website addresses, use the NPAPI to call the corresponding online banking certificate and/or online banking plugin to perform online banking login.

When the current website address accessed by the user is the same as one of the stored online banking website addresses, it can confirmed that the current website address accessed by the user is an online banking website address. At this time, the NPAPI can be used to call the corresponding online banking certificate and online banking plugin to perform online banking login; or the NPAPI can be used to call the corresponding online banking certificate or online banking plugin to perform online banking login.

In conclusion, compared with the prior art, the method for online banking login of the embodiment of the present disclosure has the following advantages:

First, the management of website addresses, certificates and/or plugins of online banking is performed, which enhances security of online banking login and decreases the steps to log in to online banking.

Next, security of online banking login is enhanced and the steps to log in to online banking are decreased through judging whether the current website address accessed by the user is an online banking website address, and installing the online banking certificates and/or online banking plugins of said online banking website address automatically when it is an online banking website address.

Embodiment 2

The method for online banking login of the embodiment of the present disclosure will be fully described.

Figure 2:
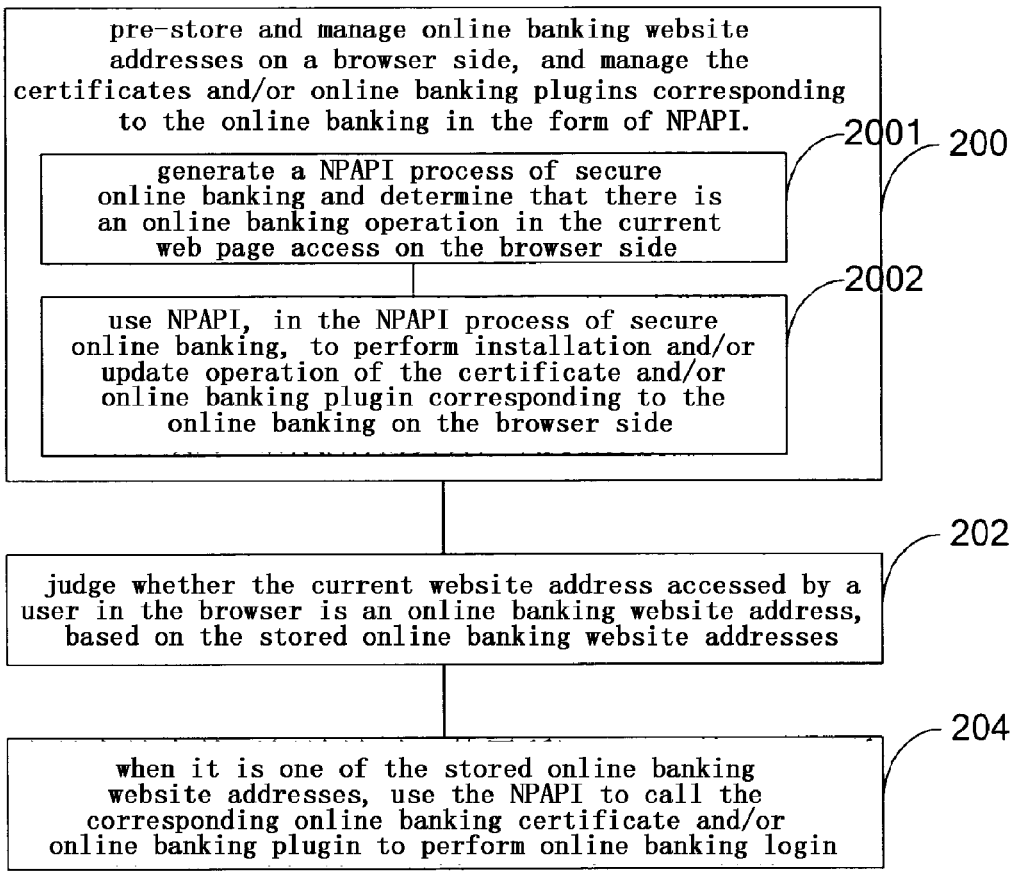
FIG. 2 shows a flow chart of a method for online banking login according to an embodiment of the present disclosure.

With reference to FIG. 2, it shows a flow chart of a method for online banking login according to an embodiment of the present disclosure.

In step 200, pre-store and manage online banking website addresses on a browser side, and manage the certificates and/or online banking plugins corresponding to the online banking in the form of NPAPI.

Specifically, online banking website addresses can be stored on the browser side, and online banking can be accessed based on the stored website addresses.

The website addresses of various online banking can be acquired and stored, and quick entries for accessing online banking can be provided for users based on the website addresses of various online banking.

And, based on the website address update information acquired from online banking, the stored online banking website addresses can be updated.

For example, the stored website addresses of online banking A is w1, while learning from the website address update information acquired from online banking A that the website address of online banking A is changed to w2, thus the stored website address w1 of online banking A can be updated to w2.

Step 200 comprises specifically:

substep 2001, generating a NPAPI process of secure online banking and determining that there is an online banking operation in the current web page access on the browser side;

Said NPAPI process of secure online banking can provide users with quick entries for accessing online banking based on the stored online banking website addresses, and by collecting official website addresses of all domestic banks and updating them in time, the NPAPI process can ensure that users always access the true online banking. Additionally, when the user is accessing bank website, the NPAPI process of secure online banking can install correct certificate and/or ActiveX plugin according to demand, and also update the installed ActiveX plugin.

substep 2002, using NPAPI, in the NPAPI process of secure online banking, to perform installation and/or update operation of the certificate and/or online banking plugin corresponding to the online banking on the browser side.

(1) As for the installation operation of the certificate corresponding to the online banking, described as follows:

When accessing the online banking through HTTPS, use NPAPI, in the NPAPI process of secure online banking, to perform the installation operation of the certificate corresponding to the online banking on the browser side.

Preferably, when accessing the online banking through HTTPS, traverse the certificate directories of the operating system where the browser is located, and detect whether the certificate corresponding to the online banking is installed.

When not installed, install the downloaded certificate corresponding to the online banking on the browser side.

For example, when accessing certain online banking A through HTTPS, the certificate directories can be traversed and it is detected whether the certificate corresponding to online banking A is installed. If the corresponding certificate of online banking A isn't installed in the certificate dictionary, then the downloaded corresponding certificate of online banking A will be installed in the certificate directory.

Preferably, in the NPAPI process of secure online banking, directly compile the certificate regarded as a resource of certificate installation program. And, load the complied resource to a memory, and directly install the certificate by the certificate installation program using the compiled resource, to install the compiled certificate to the corresponding certificate directory.

Furthermore, when using NPAPI interface in the NPAPI process of secure online banking to perform the installation of certificate corresponding to the online banking on the browser side, start a thread in the NPAPI process of secure online banking to acquire and identify the application information of privilege escalation during the certificate installation. And confirm the request of privilege escalation in the thread.

(2) As for the installation and/or update operation of the online banking plugins corresponding to online banking, described as follows:

Judge whether the online banking plugin corresponding to the online banking is installed in the current web page on the browser side. Specifically, detect each plugin in the browser, then judge whether the online banking plugin corresponding to the online banking is installed.

When not installed, use NPAPI, in the NPAPI process of secure online banking, to initiate the download request of the online banking plugin, and install the downloaded online banking plugin corresponding to the online banking on the browser side. For example, when the online banking plugin corresponding to online banking A has not been installed, NPAPI is used in the NPAPI process of secure online banking, to initiate the download request of the online banking plugin corresponding to online banking A, and the online banking plugin corresponding to online banking A is downloaded to the browser side and installed.

When installed, further judge whether the version of the installed online banking plugin corresponding to the online banking is lower than that of the downloaded online banking plugin corresponding to the online banking. For example, the version of the installed online banking plugin corresponding to the online banking A is Version 01, while the version of the downloaded online banking plugin corresponding to online banking A is Version 02, then it can be judged that the version of the installed online banking plugin of online banking A is lower than that of the downloaded online banking plugin of online banking A.

When lower, use NPAPI, in the NPAPI process of secure online banking, to perform the update operation of the installed online banking plugin corresponding to the online banking, based on the downloaded online banking plugin corresponding to the online banking. For example, the downloaded online banking plugin of the online banking A with version 02 is used to update the installed online banking plugin of online banking A with version 01.

Preferably, in the NPAPI process of secure online banking, use the update information of the corresponding online banking plugin, which is acquired from the online banking side through NPAPI, to perform the update operation of the installed corresponding online banking plugin.

In step 202, judge whether the current accessed by a user in the browser is an online banking web site address, based on stored online banking website addresses.

When the user is accessing a certain website address in the browser, it can be judged whether the current website address accessed by the user in the browser is an online banking website address based on the stored online banking website addresses.

In step 204, when it is one of the stored online banking website addresses, use the NPAPI to call the corresponding online banking certificate and/or online banking plugin to perform online banking login.

When the current website address accessed by the user is the same as one of the stored online banking website addresses, it can be confirmed that the current website address accessed by the user is an online banking website address. At this time, the NPAPI can be used to call the corresponding online banking certificate and online banking plugin to perform online banking login; or the NPAPI can be used to call the corresponding online banking certificate or online banking plugin to perform online banking login.

Figure 3:
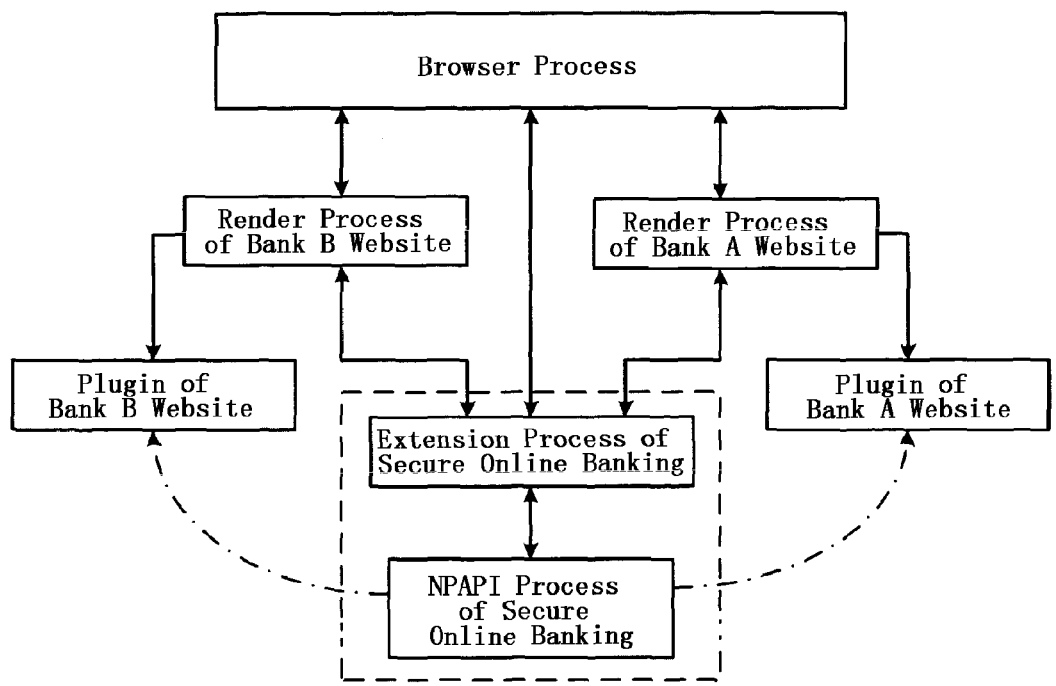
FIG. 3 shows a schematic diagram of a secure online banking system structure of a method for online banking login according to an embodiment of the present disclosure.

In a preferred embodiment of the method for online banking login of the embodiment of the present disclosure, the extension process of secure online banking and the NPAPI process of secure online banking are provided as shown in FIG. 3.

Wherein, the extension process of secure online banking can provide users with quick entries for accessing online banking, and ensure that users always access the true online banking by collecting official website addresses of domestic well-known banks and updating them in time. And when a user is accessing bank websites, NPAPI process of secure online banking can be notified to automatically install the correct certificate and ActiveX plugin according to demand. And during the user accessing bank websites, according to demand, NPAPI process of secure online banking can be notified, when it is necessary, to ensure that the correct, latest certificate and ActiveX plugin have been installed by the user.

The NPAPI process of secure online banking can automatically install ActiveX plugins of online banking and ensure that users can always safely access online banking websites by collecting the latest ActiveX plugins of domestic well-known banks and updating in time. And the security certificates of the bank websites can be installed automatically. When the online banking requires to be accessed in the form of HTTPS (short for Hypertext Transfer Protocol over Secure Socket Layer), the correct certificate is installed to the website to ensure a secure access channel.

In conclusion, compared with the prior art, the method for online banking login of the embodiment of the present disclosure has the following advantages:

First, the management of website addresses, certificates and/or plugins of online banking, including the automatic download, installation and upgrade operation, is performed, which enhances security of online banking login and decreases the steps to log in to online banking.

Second, security of online banking login is enhanced and the steps to log in to online banking are decreased through judging whether the current website address accessed by the user is an online banking website address, and installing the online banking certificates and/or online banking plugins of the online banking website address automatically when it is an online banking website address.

Next, when installing an online banking certificate, the online banking certificate is jointly compiled as a resource. When installing, firstly the online banking certificate is loaded as a resource to a memory, then the installation information of the certificate is configured to install directly, which makes no junk file generated and installation efficiency improved.

Furthermore, the installation privilege escalation request of online banking certificate is identified intellectually by multithreading technology to automatically help the user to determine, which decreases the steps to install online banking certificate.

Embodiment 3

The browser for online banking login of the embodiment of the present disclosure will be fully described.

Figure 4:
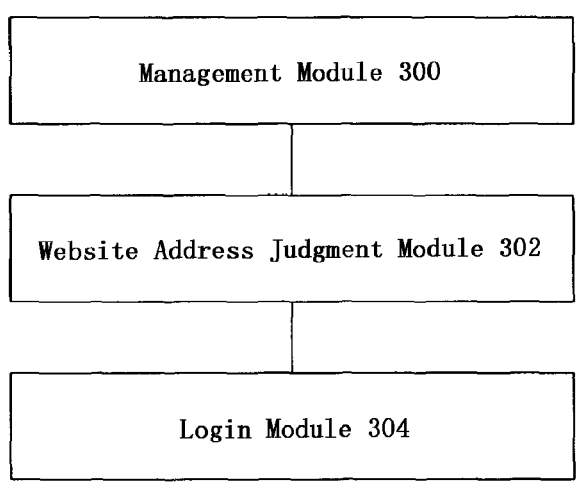
FIG. 4 shows a schematic diagram of a browser for online banking login according to an embodiment of the present disclosure.

With reference to FIG. 4, it shows a diagram of a browser for online banking login according to an embodiment of the present disclosure.

The browser for online banking login specifically comprises: management module 300, website address judgment module 302 and login module 304.

Herein below, the function of each module and the connections among the modules will be respectively described in detail.

Management module 300 is configured to pre-store and manage online banking website addresses on a browser side and manage the certificates and/or online banking plugins corresponding to the online banking in the form of NPAPI.

Management module 300 can acquire and store the website addresses of various online banking, and perform the management of the stored online banking website addresses. And, it can perform the management of the certificates corresponding to the various online banking and the online banking plugins corresponding to the various online banking in the form of NPAPI; or perform the management of the certificates corresponding to the various online banking or the online banking plugins corresponding to the various online banking in the form of NPAPI.

Website address judgment module 302 is configured to judge whether the current website address accessed by a use in the browser is an online banking website address, based on the stored online banking website addresses.

When the user is accessing a certain website address in the browser, website address judgment module 302 can judge whether the current website address accessed by the user in the browser is an online banking website address based on the stored online banking website addresses.

Login module 304 is configured to use, when it is one of the stored online banking website addresses, the NPAPI to call the corresponding online banking certificate and/or online banking plugin to perform online banking login.

When the current website address accessed by the user is the same as one of the stored online banking website addresses, website address judgment module 302 can confirm that the current website address accessed by the user is an online banking website address. At this time, login module 304 can use the NPAPI to call the corresponding online banking certificate and online banking plugin to perform online banking login; or can use the NPAPI to call the corresponding online banking certificate or online banking plugin to perform online banking login.

In conclusion, compared with the prior art, the browser for online banking login of the embodiment of the present disclosure has the following advantages:

First, the management of website addresses, certificates and/or plugins of online banking is performed, which enhances security of online banking login and decreases the steps to log in to online banking.

Next, security of online banking login is enhanced and the steps to log in to online banking are decreased through judging whether the current website address accessed by the user is an online banking website address, and installing the online banking certificates and/or online banking plugins of the online banking website address automatically when it is an online banking website address.

Embodiment 4

The browser for online banking login of the embodiment of the present disclosure will be fully described.

Figure 5:
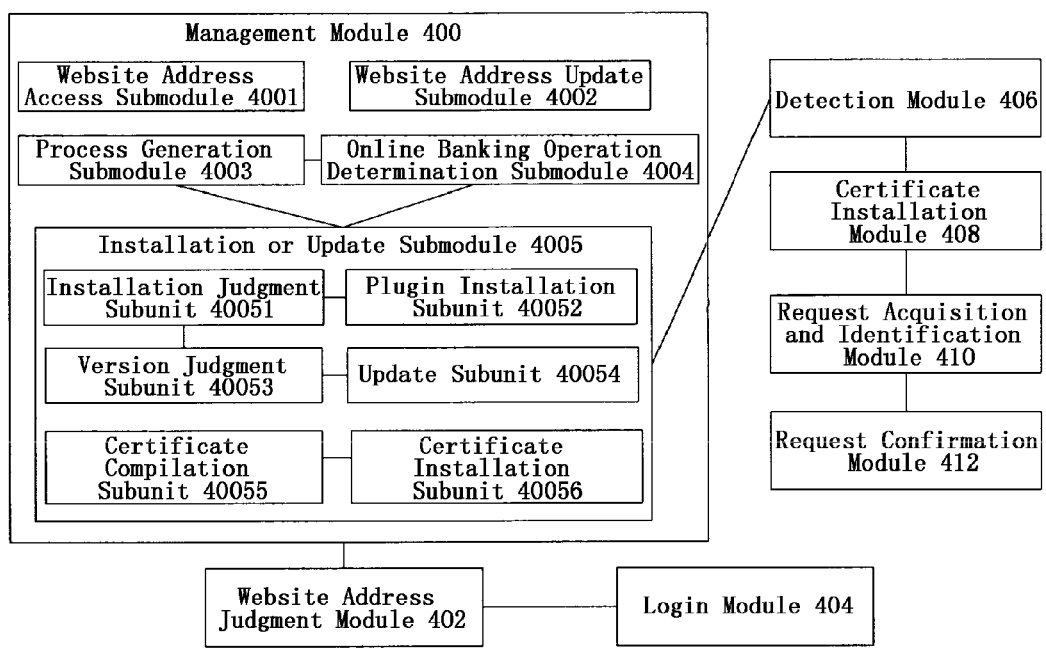
FIG. 5 shows a schematic diagram of a browser for online banking login according to an embodiment of the present disclosure.

With reference to FIG. 5, it shows a diagram of a browser for online banking login according to an embodiment of the present disclosure.

The browser for online banking login specifically comprises: management module 400, website address judgment module 402, login module 404, detection module 406, certificate installation module 408, request acquisition and identification module 410, and request confirmation module 412.

Wherein, said management module 400 comprises specifically: website address access submodule 4001, website address update submodule 4002, process generation submodule 4003, online banking operation determination submodule 4004 and installation or update submodule 4005.

Wherein, said installation or update submodule 4005 comprises specifically: installation judgment subunit 40051, plugin installation subunit 40052, version judgment subunit 40053, update subunit 40054, certificate compilation subunit 40055, and certificate installation subunit 40056.

Herein below, the functions of each component and the connections among the components will be respectively described in detail.

Management module 400 is configured to pre-store and manage online banking website addresses on a browser side and manage the certificates and/or online banking plugins corresponding to the online banking in the form of NPAPI.

Said management module 400 comprises specifically:

website address access submodule 4001, configured to store the online banking website addresses on the browser side and access online banking based on the online banking website addresses;

Website address access submodule 4001 can store online banking website addresses on the browser side, and access online banking based on the stored website addresses. It can acquire and store the website addresses of various online banking, and provide quick entries for accessing online banking for users based on the website addresses of various online banking.

website address update submodule 4002, configured to update the stored online banking website addresses based on the website address update information acquired from online banking;

process generation submodule 4003, configured to generate a NPAPI process of secure online banking;

online banking operation determination submodule 4004, configured to determinate that there is an online banking operation in the current web page access on the browser side;

installation or update submodule 4005, configured to use NPAPI, in the NPAPI process of secure online banking, to perform installation or update operation of the certificate and/or online banking plugin corresponding to the online banking on the browser side.

The installation or update submodule 4005 uses NPAPI, in the NPAPI process of secure online banking, to perform installation operation of the certificate corresponding to the online banking on the browser side, when accessing the online banking through HTTPS.

The installation or update submodule 4005 uses, in the NPAPI process of secure online banking, the update information of the corresponding online banking plugin, which is acquired from the online banking side through NPAPI, to perform the update operation of the installed corresponding online banking plugin.

The installation or update submodule 4005 comprises specifically:

installation judgment subunit 40051, configured to judge whether the online banking plugin corresponding to the online banking is installed in the current web page on the browser side;

plugin installation subunit 40052, configured to, when not installed, use NPAPI, in the NPAPI process of secure online banking, to initiate the download request of the online banking plugin, and install the downloaded online banking plugin corresponding to the online banking on the browser side;

version judgment subunit 40053, configured to, when installed, judge whether the version of the installed online banking plugin corresponding to the online banking is lower than that of the downloaded online banking plugin corresponding to the online banking;

update subunit 40054, configured to, when lower, use NPAPI, in the NPAPI process of secure online banking, to perform the update operation of the installed online banking plugin corresponding to the online banking, based on the downloaded online banking plugin corresponding to the online banking.

certificate compilation subunit 40055, configured to directly compile, in the NPAPI process of secure online banking, the certificate, which is regarded as a resource of certificate installation program;

certificate installation subunit 40056, configured to load the complied resource to a memory, and directly install the certificate by the certificate installation program using the compiled resource, to install the compiled certificate to the corresponding certificate directory.

Website address judgment module 402 is configured to judge whether the current website address accessed by a use in the browser is an online banking website address, based on the stored online banking website addresses.

When the user is accessing a certain website address in the browser, website address judgment module 402 can judge whether the current website address accessed by the user in the browser is an online banking website address based on the stored online banking website addresses.

Login module 404 is configured to use, when it is one of the stored online banking website addresses, the NPAPI to call the corresponding online banking certificate and/or online banking plugin to perform online banking login.

When the current website address accessed by the user is the same as one of the stored online banking website addresses, website address judgment module 402 can confirm that the current website address accessed by the user is an online banking website address. At this time, login module 404 can use the NPAPI to call the corresponding online banking certificate and online banking plugin to perform online banking login; or can use the NPAPI to call the corresponding online banking certificate or online banking plugin to perform online banking login.

Detection module 406 is configured to traverse the certificate directories of the operating system where the browser is located, and detect whether the certificate corresponding to the online banking is installed, before the installation or update submodule uses NPAPI, in the NPAPI process of secure online banking, to perform the installation operation of the certificate corresponding to the online banking on the browser side.

Certificate installation module 408 is configured to, when not installed, install the downloaded certificate corresponding to the online banking on the browser side.

Request acquisition and identification module 410 is configured to start a thread, in the NPAPI process of the secure online banking, to acquire and identify the application information of privilege escalation during the certificate installation, when using NPAPI, in the NPAPI process of secure online banking, to perform the installation operation of the certificate corresponding to the online banking on the browser side.

Request confirmation module 412 is configured to confirm the request of privilege escalation in the thread.

In conclusion, compared with the background art, the browser for online banking login of the embodiment of the present disclosure has the following advantages:

First, the management of website addresses, certificates and/or plugins of online banking, including the automatic download, installation and upgrade operation, is performed, which enhances security of online banking login and decreases the steps to log in to online banking.

Second, security of online banking login is enhanced and the steps to log in to online banking are decreased through judging whether the current website address accessed by the user is an online banking website address, and installing the online banking certificates and/or online banking plugins of the online banking website address automatically when it is an online banking website address.

Next, when installing an online banking certificate, the online banking certificate is jointly compiled as a resource. When installing, firstly the online banking certificate is loaded as a resource to a memory, then the installation information of the certificate is configured to install directly, which makes no junk file generated and installation efficiency improved.

Additionally, the installation privilege escalation request of online banking certificate is identified intellectually by multithreading technology to automatically help the user to determine, which decreases the steps to install online banking certificate.

Furthermore, in the embodiment of the invention, the management of online banking certificates and/or online banking plugins is implemented in the form of NPAPI, including automatic download, installation and/or upgrade of online banking certificates and plugins. Moreover, it can be judged automatically whether the current website address accessed by a user is an online banking website address, and if an online banking website address, the online banking login is performed based on the online banking certificate and/or the online banking plugin. Thus, the problems is solved, of complex and trivial steps and insecurity of online banking login via web navigation websites, and the benefit effect is achieved, of decreasing steps of online banking login and enhancing security to online banking login. Further, in the embodiments of the present disclosure, the management of online banking certificates and/or online banking plugins is implemented in the form of NPAPI, so it can ensure the safety of using online banking in NPAPI (Netscape Plugin Application Programming Interface)-supported browsers, such as Mozilla Firefox, Google Chrome, Apple Safari, Opera, etc., which are often used in the industry.

It should be noted that:

For a brief description, the abovementioned method embodiment is described as a series of action combination. While the skilled of the art should know that the application is unlimited in the described action sequence, because according to the application, some steps can be described in other sequences or they can be implemented simultaneously. In addition, the skilled of the art should know that the embodiments in the description are preferred embodiments, and the actions involved in the embodiments are not all needed in the application.

The provided algorithms and displays are irrelevant to any specific computers, virtual systems or other inherent device components. Various general systems can work simultaneously with the teachings based on the application. According to the above description, the required structure to build the system is apparent. Additionally, the present disclosure is not specific to any programming language. It should be known that, the description of the present disclosure can be implemented through various programming language, and the description for specific languages is the best embodiment to disclose the present disclosure.

To the device embodiment, it is described simply for it is basically similar with the method embodiment. The correlated parts can be seen in the method embodiment.

The embodiments of the present disclosure are described in a progressive way. Each embodiment focuses on the differences from others while the similarities can be referred among the embodiments.

The component embodiments of the present disclosure can be implemented by means of hardware, or the software module implemented on one or more processors, or by means of the combination of hardware and software. The skilled of the art should understand that, microprocessors or digital signal processors (DSP) can be used to implement some or all functions of some or all components in the browser user terminal, which allows to log in to online banking according to the embodiments of the present disclosure. The invention can also implement some or all devices or device programs (e.g., computer programs and computer program products) which are used to execute the method above. The program implementing the present disclosure in this way can be stored on computer readable media, or it can have the form of one or many signals. The signals can be downloaded from the Internet, or they can be provided by carrier signals or any other forms.

Figure 6:
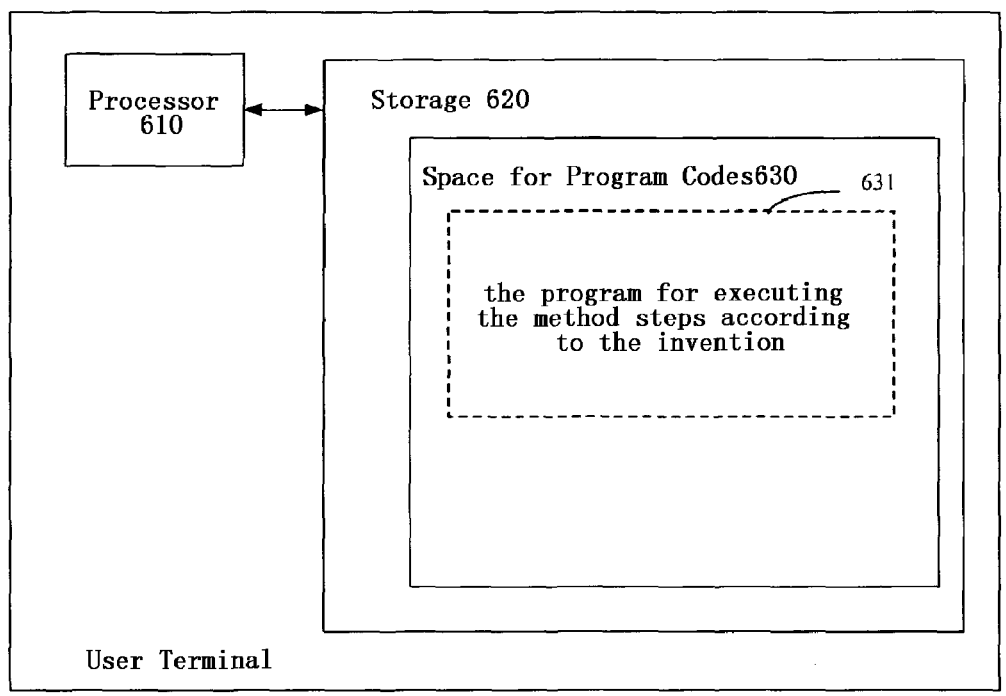
FIG. 6 schematically shows a block diagram of a user terminal for executing the method according to the present disclosure, and FIG. 7 schematically shows a storage unit for holding or carrying the program codes for implementing the method according to the present disclosure.
Figure 7:
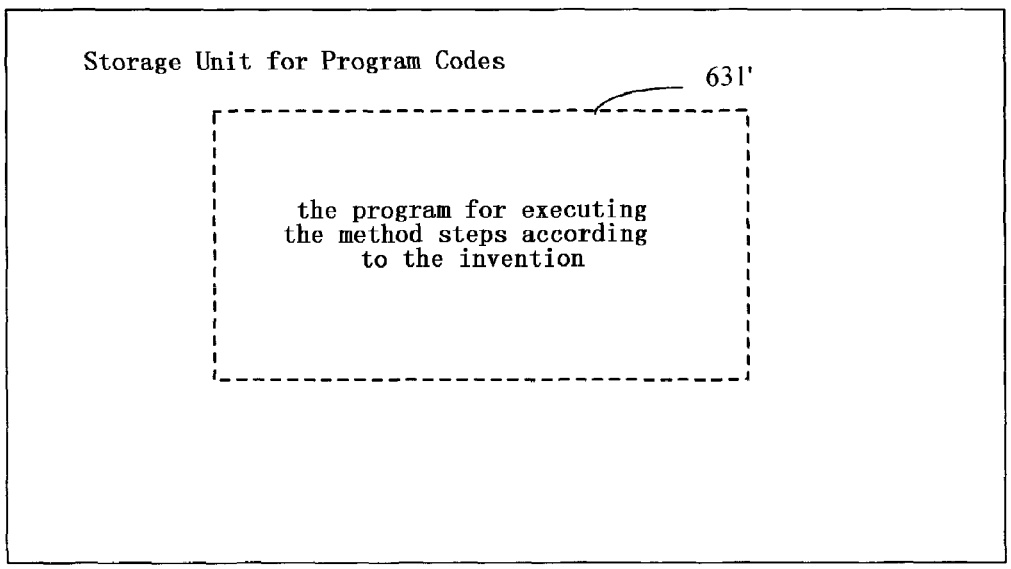

For example, FIG. 6 schematically shows a user terminal used to execute methods for online banking login according to the present disclosure. The user terminal traditionally comprises processor 610 and the computer program products or computer readable media in the form of storage 620. Storage 620 can be the electronic storage like flash, EEPROM (short for Electrically Erasable Programmable Read-Only Memory), EPROM (short for Electrically Programmable Read-Only Memory), hard disk or ROM. Storage 620 includes storage space 630 that stores program code 631 implementing any steps of the method above. For example, storage space 630 for program code can include respective program code 631 that respectively implement various steps of the method above. These program codes can be read out from or written into one or more computer program products. The computer program products comprise program code carriers like hard disk, compact disk (CD), storage card or floppy disk. The computer program products are generally the portable or fixed storage units as shown in FIG. 7. The storage units can have storage segments, storage spaces, etc. arranged similar to those of the storage 620 in the terminal of FIG. 6. For instance, program codes can be compressed in appropriate forms. In general, storage units comprise computer readable code 631' which can be read by processors like processor 610. When the user terminal runs the codes, causing the user terminal to implement the respective step of the method described above.

The said "one embodiment", "embodiment" or "one or more embodiments" refer to at least one embodiment in the invention, combining specific features, structures or characteristics described in the embodiments. In addition, it needs to notice that, the phrases, "in one embodiment", may not all refer to the same embodiment.

The description provided herein illustrates numerous details. Nevertheless, it is understood that the embodiments of the invention can be implemented without the details. In some embodiments, the common methods, structures and technologies are not illustrated in detail, so as to provide a clear understanding of the description.

It should be noted that the embodiments is intended to illustrate and not to limit the invention. The skilled of the art can design the alternative embodiments without departing from the scope of the appended claims. In the claims, any reference signals between brackets are not allowed to restrict the claims. The word "comprise" cannot exclude the elements or steps that are not listed in the claims. And the word "a" or "one" before the element cannot exclude the existence of a plurality of such elements. The invention can be accomplished with the hardware including several different elements, and with proper programming computers. In the unit claims that illustrate devices, some of the devices can be embodied via one hardware item. The use of the words "first", "second", "third" and others does not represent any sequence and can be interpreted as names.

Additionally, it also should be noticed that the language of the description is not used to explain or limit the subject of the invention, but for the readability and the purpose of teaching. Therefore, the variations and modifications will be evident to those of ordinary skill in the art, without departing from the scope and spirit of the invention. The disclosure to the scope of the invention is illustrative rather than restrictive. The scope of the invention is limited by the appended claims.

What is claimed is:

1. A method for online banking login, comprising:
   prior to performing online banking login, pre-storing and managing online banking website addresses on a browser side and at least one of installing and upgrading, on the browser side, at least one of certificates and online banking plugins corresponding to the online banking in a form of NPAPI;
   judging whether the online banking plugin corresponding to the online banking is installed in a current web page on the browser side;
   when not installed, using NPAPI, in an NPAPI process of secure online banking, to initiate a download request of the online banking plugin, and installing the downloaded online banking plugin corresponding to the online banking on the browser side:
   when installed, judging whether a version of the installed online banking plugin corresponding to the online banking is lower than that of the downloaded online banking plugin corresponding to the online banking;
   when lower, using NPAPI, in the NPAPI process of secure online banking, to perform the update operation of the installed online banking plugin corresponding to the online banking, based on the downloaded online banking plugin corresponding to the online banking;
   judging whether a current website address accessed by a user in the browser is an online banking website address, based on the stored online banking website addresses; and
   when the current website address is one of the stored online banking website addresses, using the NPAPI to call the corresponding at least one installed or upgraded certificate or online banking plugin to perform online banking login.

2. The method according to claim 1, wherein pre-storing and managing online banking website addresses on the browser side and at least one of installing and upgrading, on the browser side, at least one of certificates and online banking plugins corresponding to the online banking in the form of NPAPI comprises:
   storing the online banking website addresses on the browser side and accessing online banking based on the online banking website addresses; and
   updating the stored online banking website addresses based on the website address update information acquired from the online banking.

3. The method according to claim 1, wherein the at least one of installing and upgrading at least one of the certificates and online banking plugins corresponding to the online banking in the form of NPAPI comprises:
   generating a NPAPI process of secure online banking;
   determining that there is the online banking operation in the current web page accessed on the browser side; and
   using NPAPI, in the NPAPI process of secure online banking, to perform at least one of an installation and an update operation of the at least one certificate or online banking plugin corresponding to the online banking on the browser side.

4. The method according to claim 3, wherein using NPAPI to perform the installation operation of the certificate corresponding to the online banking on the browser side comprises:
   using NPAPI, in the NPAPI process of secure online banking, to perform the installation operation of the certificate corresponding to the online banking on the browser side, when accessing the online banking through HTTPS.

5. The method according to claim 3, wherein using NPAPI to perform the update operation of the online banking plugin corresponding to the online banking on the browser side comprises:
   using, in the NPAPI process of secure online banking, the update information of the corresponding online banking plugin, which is acquired from the online banking side through NPAPI, to perform the update operation of the installed corresponding online banking plugin.

6. The method according to claim 4, wherein before using NPAPI, in the NPAPI process of secure online banking, to perform the installation operation of the certificate corresponding to the online banking on the browser side, further comprises:
   traversing certificate directories of an operating system where the browser is located, and detecting whether the certificate corresponding to the online banking is installed; and
   when not installed, installing the downloaded certificate corresponding to the online banking on the browser side.

7. The method according to claim 4, wherein using NPAPI, in the NPAPI process of secure online banking, to perform the installation operation of the certificate corresponding to the online banking on the browser side comprises:
   directly compiling, in the NPAPI process of secure online banking, the certificate, which is regarded as a resource of a certificate installation program; and
   loading the complied resource to a memory, and directly installing the certificate by the certificate installation program using the compiled resource, to install the compiled certificate to a corresponding certificate directory.

8. The method according to claim 4, further comprising:
   starting a thread, in the NPAPI process of the secure online banking, to acquire and identify application information of privilege escalation during the certificate installation, when using NPAPI, in the NPAPI process of secure online banking, to perform the installation operation of the certificate corresponding to the online banking on the browser side; and
   confirming the request of privilege escalation in the thread.

9. A browser for online banking login, comprising:
a memory having instructions stored therein; and
at least one processor to execute the instructions to cause:
prior to performing online banking login, pre-storing and at least one of installing and upgrading online banking website addresses on a browser side and at least one of certificates and online banking plugins corresponding to the online banking in a form of NPAPI on the browser side;
judging whether the online banking plugin corresponding to the online banking is installed in the current web page on the browser side;
when not installed, using NPAPI, in the NPAPI process of secure online banking, to initiate the download request of the online banking plugin, and installing the downloaded online banking plugin corresponding to the online banking on the browser side:
when installed, judging whether the version of the installed online banking plugin corresponding to the online banking is lower than that of the downloaded online banking plugin corresponding to the online banking; and
when lower, using NPAPI, in the NPAPI process of secure online banking, to perform the update operation of the installed online banking plugin corresponding to the online banking, based on the downloaded online banking plugin corresponding to the online banking;
judging whether a current website address accessed by a user in the browser is an online banking website address, based on the stored online banking website addresses; and
when the current website address is one of the stored online banking website addresses, using the NPAPI to call the corresponding at least one installed or upgraded certificate or online banking plugin to perform online banking login.

10. The browser according to claim 9, wherein pre-storing and at least one of installing and upgrading online banking website addresses on the browser comprises:
storing the online banking website addresses on the browser side and accessing online banking based on the online banking website addresses; and
updating the stored online banking website addresses based on the website address update information acquired from online banking.

11. The browser according to claim 9, wherein the at least one of installing and upgrading the at least one of certificates and online banking plugins corresponding to the online banking in the form of NPAPI comprises:
generating a NPAPI process of secure online banking;
determining that there is the online banking operation in the current web page accessed on the browser side; and
using NPAPI, in the NPAPI process of secure online banking, to perform at least one of an installation and an update operation of the at least one certificate or online banking plugin corresponding to the online banking on the browser side.

12. The browser according to claim 11, wherein using NPAPI to perform the installation operation of the certificate corresponding to the online banking on the browser side comprises:
using NPAPI, in the NPAPI process of secure online banking, to perform the installation operation of the certificate corresponding to the online banking on the browser side, when accessing the online banking through HTTPS.

13. The browser according to claim 11, wherein using NPAPI to perform the update operation of the online banking plugin corresponding to the online banking on the browser side comprises:
using in the NPAPI process of secure online banking, the update information of the corresponding online banking plugin, which is acquired from the online banking side through NPAPI, to perform the update operation of the installed corresponding online banking plugin.

14. The browser according to claim 12, wherein before using NPAPI, in the NPAPI process of secure online banking, to perform the installation operation of the certificate corresponding to the online banking on the browser side, the processor further executes the instructions to cause:
traversing certificate directories of an operating system where the browser is located, and detecting whether the certificate corresponding to the online banking is installed; and
when not installed, installing the downloaded certificate corresponding to the online banking on the browser side.

15. The browser according to claim 12, wherein using NPAPI, in the NPAPI process of secure online banking, to perform the installation operation of the certificate corresponding to the online banking on the browser side comprises:
directly compiling, in the NPAPI process of secure online banking, the certificate, which is regarded as a resource of a certificate installation program; and
loading the complied resource to a memory, and directly installing the certificate by the certificate installation program using the compiled resource, to install the compiled certificate to a corresponding certificate directory.

16. The browser according to claim 12, wherein the processor further executes the instructions to cause:
starting a thread, in the NPAPI process of the secure online banking, to acquire and identify application information of privilege escalation during the certificate installation, when using NPAPI, in the NPAPI process of secure online banking, to perform the installation operation of the certificate corresponding to the online banking on the browser side; and
confirming the request of privilege escalation in the thread.

17. A non-transitory computer readable medium having instructions stored therein that, when executed by at least one processor, cause the at least one processor to perform operations for online banking login, which comprise:
prior to performing online banking login, pre-storing and managing online banking website addresses on a browser side and at least one of installing and upgrading, on the browser side, at least one of certificates and online banking plugins corresponding to the online banking in a form of NPAPI;
judging whether the online banking plugin corresponding to the online banking is installed in the current web page on the browser side;
when not installed, using NPAPI, in the NPAPI process of secure online banking, to initiate the download request of the online banking plugin, and installing the downloaded online banking plugin corresponding to the online banking on the browser side:
when installed, judging whether the version of the installed online banking plugin corresponding to the online banking is lower than that of the downloaded online banking plugin corresponding to the online banking; and when lower, using NPAPI, in the NPAPI process of secure online banking, to perform the update operation of the installed online banking plugin corresponding to the online banking, based on the downloaded online banking plugin corresponding to the online banking;

judging whether a current website address accessed by a user in the browser is an online banking website address, based on the stored online banking website addresses; and when the current website address is one of the stored online banking website addresses, using the NPAPI to call the corresponding at least one installed or upgraded certificate or online banking plugin to perform online banking login.

\* \* \* \* \*